2,943,068
SHELL MOLDING COMPOSITIONS

Bernard Freedman, Springfield, Mass., assignor to Monsanto Chemical Company, St. Louis, Mo., a corporation of Delaware No Drawing. Filed Aug. 23, 1957, Ser. No. 680,007

8 Claims. (Cl. 260—19)

This invention relates to shell molding compositions. More particularly it relates to a shell core and mold release lubricant system for foundry resin coated sand and a method for using the same.

Shell molds are used in the foundry industry for the casting of molten metals. These molds consist of thin shells of sand bonded with a thermosetting resin and are prepared by contacting a large excess of a flowable mixture of sand and binder with a heated metal pattern. The heat from the pattern fuses that portion of the binder lying in proximity thereto, forming a thin shell of 0.1–1.5 inches thickness on the pattern; the time of contact and the temperature of the pattern governing the shell thickness. Excess sand-binder mixture is removed from the shell for future re-use and the shell and pattern are heated to cure the binder to final hardness. Finally, the hardened shell is stripped from the pattern preparatory to mold assembly and metal casting operations.

Many sand-binder compositions are prepared by mixing aqueous or alcoholic phenolic resin solutions into premixed blends of sand and hexamethylenetetramine. Such compositions usually have appreciable green strength, e.g., poor flowability and a tendency to agglomerate. The incorporation of small quantities of lubricant in such sand-binder compositions considerably improves their flowability, reduces their tendency to form agglomerates and increases the bake strength of shell molds prepared therefrom. When alcoholic resin solutions are used, a constant flow of air is necessarily maintained upon the mixer to prevent the alcohol vapor concentration from reaching explosive limits. This air flow makes it difficult to incorporate lubricant into the sand-binder mixture since the conventional dry, flocculent lubricants tend to be blown away.

It is an object of this invention to provide substantially permanently free-flowing molding compositions derived from sand and solutions of phenolic resins.

Another object is to provide shell molding compositions having improved flowability and superior bake strength properties.

Another object is to provide a non-dusting lubricant readily incorporable into shell molding compositions.

A further object is to provide a method for preparing shell molding compositions.

These and other objects are attained by intimately blending sand with suitable proportions of hexamethylenetetramine, a potentially thermosetting phenolic resin and an emulsified lubricant. The phenolic resin may be either an acid-catalyzed phenol-aldehyde or a partially advanced alkali-catalyzed phenol-aldehyde resin and may be dry or dissolved in water or an organic solvent such as an aliphatic alcohol or ketone containing 1–4 carbon atoms. The emulsified lubricant is an aqueous dispersion of a metallic soap such as zinc stearate, aluminum oleate, calcium stearate, etc. or ethylene-bis-stearamide, etc., and a non-ionic mono-ester of a fatty acid containing 10–24 carbon atoms and a polyethylene glycol having an average molecular weight of at least 200.

It has long been known that the incorporation of a lubricant into shell molding compositions will increase the bake strength of shell molds prepared therefrom. However, the tensile strength increases obtained usually amount to only about 50–150 p.s.i. Now it has been found that through the use of equivalent quantities of metallic soap lubricants in emulsion form, tensile strength increases of 200–400 p.s.i. can be obtained. The emulsifiers used in these emulsions are themselves lubricating materials and therefore should provide some additional tensile strength. However, the strength increases obtained far exceed those which can be anticipated from the mere combined effect of two lubricants. In other words, there is a synergistic increase in the bake strength of shell molds prepared from shell molding compositions containing these emulsified lubricants.

The following examples are given in illustration of the invention and are not intended as limitations thereon. Where parts are mentioned they are parts by weight.

EXAMPLE I

Lubricant-free comparative molding composition. One hundred parts of #100 Ottawa sand and 0.35 part of hexamethylenetetramine are intimately blended in a conventional muller. Then 2.5 parts of a 2-stage phenol-formaldehyde novolak dissolved in ethanol as a 60% solution are added and mulling is continued until the mixture passes through a doughy ball-like stage and becomes a free-flowing molding composition. The phenol-formaldehyde resin used is prepared by reacting 1.0 mol of phenol with about 0.75 mol of formaldehyde under acid conditions. Standard tensile strength test bars of 0.3 square inch cross-sectional area at the point of break are prepared by pouring the molding composition into a steel mold pre-heated to 450° F.; the mold being shaped to form symmetrical test bars which in the elevated view resemble hour glasses nipped into a 1 inch width and which are a uniform 0.3 inch in depth. After 10 seconds of contact, the excess is removed and the test bar and pattern are heated in an oven at 600° F. for two minutes. Tensile strength of these test bars averages about 285 p.s.i.

EXAMPLE II

Comparative molding composition containing calcium stearate as the only lubricant. One hundred parts of #100 Ottawa sand and 0.35 part of hexamethylenetetramine are intimately blended in a conventional muller. Then 2.5 parts of the 2-stage phenol-formaldehyde novolak in ethanol solution used in Example I are added and mulling is continued until the mixture approaches a doughy ball-like consistency. At this point, 0.1 part of calcium stearate is added; all air flow across the mixture having been halted to avoid loss of lubricant. Mulling is resumed and continued until the mixture passes through a doughy ball-like stage and becomes a free-flowing molding composition. Standard test bars prepared as in Example I have an average tensile strength of about 435 p.s.i.

EXAMPLE III

Comparative molding composition containing an emulsified calcium stearate lubricant. The process of Example II is repeated except that 0.2 part of an emulsion consisting essentially of 50% by weight of calcium stearate, 45% by weight of water, and 5% by weight of nonaethylene-glycol-monostearate is substituted for the dry calcium stearate used therein. Standard test bars prepared as in Example I have an average tensile strength of about 650 p.s.i.

EXAMPLE IV

Comparative molding composition containing ethylene-bis-stearamide as the only lubricant. The process of Example II is repeated except that 0.1 part of dry ethylene-bis-stearamide is substituted for the dry calcium stearate used therein. Standard test bars prepared as in Example I have an average tensile strength of about 350 p.s.i.

EXAMPLE V

Comparative molding composition containing an emulsified ethylene-bis-stearamide lubricant. The process of Example II is repeated except that 0.3 part of an emulsion consisting essentially of 33% by weight of ethylene-bis-stearamide, 63% by weight of water, and 4% by weight of nonaethylene-glycol-monolaurate is substituted for the dry calcium stearate used therein. Standard test bars prepared as in Example I have an average tensile strength of about 490 p.s.i.

EXAMPLE VI

One hundred parts of #100 Ottawa sand and 0.35 part of hexamethylenetetramine are intimately blended in a conventional muller. Then 2.5 parts of the 2-stage phenol-formaldehyde novolak in ethanol solution used in Example I are added and mulling is continued for about 1 minute. At this point, 0.225 part of an emulsion consisting essentially of 45% by weight of zinc stearate, 50% by weight of water, and 5% by weight of nonaethylene-glycol-monostearate are added. Mulling is resumed and continued until the mixture passes through a doughy ball-like stage and becomes a free-flowing molding composition. Standard test bars prepared as in Example I have an average tensile strength of about 515 p.s.i.

The synergistic increase in tensile strength realized in shell molding compositions prepared using emulsified lubricants as against those prepared using dry conventional lubricants is evident from the following table showing this effect for the dry versus the emulsified forms of two conventional lubricants, i.e., calcium stearate and ethylene-bis-stearamide. All are compared to a control shell molding composition containing no lubricant.

Table I

| | P.s.i. |
|---|---|
| No lubricant | 285 |
| Calcium stearate—dry | 435 |
| Calcium stearate—emulsion | 650 |
| Ethylene-bis-stearamide—dry | 350 |
| Ethylene-bis-stearamide—emulsion | 490 |

This invention is not limited to any particular sand; rather, any conventional shell molding sand may be used. Acceptable sands are found in many parts of the world and vary substantially in particle size and shape, purity, clay content, etc. Therefore, when preparing shell molding compositions, the optimum resin concentration and mixing time may vary somewhat from sand to sand. AFS #100 Ottawa sand has been used intentionally in all of the foregoing examples to illustrate the advantages of this invention and the synergistic effect of the emulsified lubricant upon the bake strength of shell molds prepared according to this invention without introducing the further variables of sand type, particle size, and clay content. Ottawa sand is a round grained, high silica sand obtained from extensive St. Peter's sandstone formation covering areas of Illinois, Wisconsin, Iowa, Minnesota, Missouri and Arkansas.

Many potentially thermosetting phenolic resins are available as shell or core binders. Broadly, they may be classified as either acid-catalyzed novolaks or alkali-catayzed resoles; both types may be used in practicing this invention. Novolaks are prepared by reacting about one molar portion of phenol with less than one molar portion of aldehyde, e.g., 0.75 molar portion of formaldehyde, under acid conditions. Such resins are also called 2-stage resins since they are deficient in aldehyde and thus cannot be self-cured, but must instead be cured by adding more aldehyde or a hardening agent such as hexamethylenetetramine, paraformaldehyde, etc., at the time of use. Resoles are prepared by reacting about one molar portion of phenol with 0.7–2.0 molar portions of aldehyde under alkaline conditions. These resins are also called 1-stage resins since they may later be self-cured merely by heating. While phenol-formaldehyde resins are most commonly used, this invention encompasses resins wherein all or part of the phenol is replaced by an equivalent quantity of one or more of the other monohydroxy or polyhydroxy benzene compounds such as cresol, xylenol, resorcinol, phloro-glucinol, etc. Similarly, all or part of the formaldehyde may be replaced by an equivalent quantity of one or more of its higher homologs such as paraformaldehyde, acetaldehyde, trioxymethylene, etc.

The phenolic resin may be incorporated into the shell molding composition either as dry resin or as an aqueous or organic solution containing 30% or more resin by weight. The organic solvents used are primary, secondary, and tertiary aliphatic alcohols and ketones containing 1–4 carbon atoms, e.g., methanol, isopropanol, tertiary butanol, acetone, etc. Shell molding compositions having the most satisfactory properties are obtained when 1–5 parts of phenolic resin, based upon the weight of dry resin, are thoroughly admixed with each 100 parts of sand. In keeping with the aim of demonstrating the synergistic effect of the emulsified lubricant upon the shell-mold bake strength without introducing unnecessary variables, one phenolic resin solution has been used in all of the foregoing examples. This phenolic resin solution is a 60% solution of a 2-stage phenol-formaldehyde novolak in ethanol prepared by reacting one molar portion of phenol with 0.75 molar portion of formaldehyde in the presence of an acid catalyst.

The 2-stage novolaks are rendered curable, or heat-hardenable, by incorporating a hardening agent such as hexamethylenetetramine, paraformaldehyde, etc. into the shell molding compositions. Normally, about 10–15 parts by weight of hardening agent are required to satisfactorily cure each 100 parts by weight of 2-stage novolak. It has also been found that the bake strength of shell molds prepared using 1-stage resole resins can be increased by incorporating 2–5 parts by weight of hardening agent per 100 parts by weight of 1-stage resole into the shell molding composition. However, hardening agents may be omitted if desired when such 1-stage resoles are used as the binder.

The emulsion lubricants of this invention are aqueous emulsions of a solid wax such as a metallic soap or ethylene-bis-stearamide, etc., and a non-ionic emulsifier which is itself a waxy material. Many metallic soaps or mixtures thereof may be used, e.g., lead stearate, calcium stearate, barium stearate, magnesium stearate, cadmium stearate, aluminum stearate, zinc stearate, aluminum palmitate, aluminum oleate, etc. The non-ionic emulsifiers used are mono-esters of fatty acids containing 10–24 carbon atoms, e.g., lauric acid, oleic acid, stearic acid, etc., and polyethylene glycols having molecular weights in excess of 200. Natural oils containing these fatty acids, e.g., mustardseed oil, coconut oil, etc., may also be esterified with the polyethylene glycols to form suitable emulsifiers. Generally these emulsion lubricants are prepared by mixing 3–8 parts by weight of polyethylene glycol mono-ester into 67–22 parts by weight of water, followed by the addition of 30–70 parts by weight of metallic soap and thoroughly mixing. When preparing shell molding compositions, about 1–5 parts, based upon the weight of metallic soap, of emulsified lubricant are used for each 100 parts by weight of phenolic resin solids.

In preparing shell molding compositions according to this invention the sand and hardening agent are intimately premixed. The emulsion lubricant may be added at any desired stage in the process to obtain compositions possessing superior bake strength properties. However, it has been found that the maximum bake strength is obtained when the emulsion lubricant is added about 3 to 4 minutes after the phenolic resin has been added or just prior to that point at which the mixture forms a doughy ball-like mass. If heat is used to facilitate evaporation of the resin solvent this doughy condition is more rapidly attained and the emulsion lubricant must be added earlier. The components are blended in conventional equipment, e.g. mullers, etc., using more or less standard foundry techniques. For example, either the hot or cold blending methods may be employed.

In addition to the improved bake strengths obtained, use of these emulsion lubricants overcomes the dusting problem present in the foundry production of shell molding compositions when organic solutions of the phenolic resin are used. The extreme flammability of the vapors from these solutions creates a severe fire and explosion hazard. Safety precautions require the maintenance of a constant positive pressure flow of air across the surface of the molding composition as it is being blended. Considerable difficulty has been experienced with dusting of the dry and flocculant conventional lubricants. Often excess lubricant is added in an attempt to compensate for that which is blown away. Obviously, this practice leads to severe non-uniformity of shell molding compositions and is economically unsound; disadvantages which this invention overcomes.

Shell molding compositions prepared according to the teachings of this invention are free flowing, have decreased green strength, and do not tend to agglomerate. Therefore, extremely uniform and densely packed shell molds with very smooth surfaces may be prepared from the products of this invention.

It is obvious that many variations may be made in the process and compositions heretofore described without departing from the spirit and scope of this invention.

What is claimed is:

1. A shell molding composition consisting essentially of an intimate mixture of (1) about 100 parts of sand, (2) about 1–5 parts of a potentially thermosetting phenolic resin selected from the group consisting of acid catalyzed novolaks and alkali-catalyzed resoles, (3) about 0.02–0.75 part of a hardening agent selected from the group consisting of hexamethylenetetramine and paraformaldehyde and (4) about 0.014–0.83 part of an aqueous dispersion consisting essentially of (a) 30–70 parts of a solid wax selected from the group consisting of ethylene-bis-stearamide and the lead, calcium, barium, magnesium, aluminum and zinc soaps of stearic, palmitic and oleic acids, (b) 67–22 parts of water and (c) 3–8 parts of a non-ionic mono-ester of a fatty acid containing 10–24 carbon atoms and a polyethylene glycol having an average molecular weight of at least 200.

2. A shell molding composition as in claim 1 wherein the potentially thermosetting phenolic resin is an acid-catalyzed 2-stage phenol-formaldehyde novolak.

3. A shell molding composition as in claim 1 wherein the aqueous emulsion is comprised essentially of (a) 30–70 parts of calcium stearate, (b) 67.22 parts of water and (c) 3–8 parts of nonaethylene glycol monostearate.

4. A shell molding composition as in claim 1 wherein the aqueous emulsion is comprised essentially of (a) 30–70 parts of zinc stearate, (b) 67–22 parts of water, and (c) 3–8 parts of nonaethylene glycol monostearate.

5. A shell molding composition as in claim 1 wherein the aqueous emulsion is comprised essentially of (a) 30–70 parts of ethylene-bis-stearamide, (b) 67–22 parts of water, and (c) 3–8 parts of nonaethylene glycol monostearate.

6. A method for preparing the shell molding compositions of claim 5 which consists essentially of (1) intimately premixing about 100 parts of sand with about 0.02–0.75 part of a hardening agent selected from the group consisting of hexamethylenetetramine and paraformaldehyde, (2) adding about 1–5 parts of a potentially thermosetting resin selected from the group consisting of acid-catalyzed novolaks and alkali-catalyzed resoles, (3) mixing said sand, hardening agent and resin and before said mixture attains a doughy ball-like consistency adding about 0.014–0.83 part of an aqueous dispersion and (4) continuing mixing until the mixture passes through a doughy ball-like stage and becomes a free-flowing molding composition; said aqueous dispersion consisting essentially of (a) 30–70 parts of a solid wax selected from the group consisting of ethylene-bis-stearamide and the lead, calcium, barium, magnesium, aluminum and zinc soaps of stearic, palmitic and oleic acids, (b) 67–22 parts of water and (c) 3–8 parts of nonionic mono-ester of a fatty acid containing 10–24 carbon atoms and a polyethylene glycol having an average molecular weight of at least 200.

7. A method as in claim 6 wherein the potentially thermosetting phenolic resin is essentially 30–70 parts of an acid-catalyzed 2-stage phenol-formaldehyde novolak dissolved in 70–30 parts of a solvent selected from the group consisting of water, aliphatic alcohols containing 1–4 carbon atoms and aliphatic ketones containing 1–4 carbon atoms.

8. A method as in claim 6 wherein the aqueous dispersion is added 3–4 minutes after the potentially thermosetting resin.

References Cited in the file of this patent

UNITED STATES PATENTS

| | | |
|---|---|---|
| 2,425,828 | Retzsch et al. | Aug. 19, 1947 |
| 2,666,685 | Hommel et al. | Jan. 19, 1954 |
| 2,706,163 | Fitko | Apr. 12, 1955 |
| 2,770,859 | Henry | Nov. 20, 1956 |
| 2,869,195 | Cooper | Jan. 20, 1959 |

UNITED STATES PATENT OFFICE

CERTIFICATE OF CORRECTION

Patent No. 2,943,068                        June 28, 1960

Bernard Freedman

It is hereby certified that error appears in the printed specification of the above numbered patent requiring correction and that the said Letters Patent should read as corrected below.

Column 3, line 70, for "catayzed" read -- catalyzed --; column 6, line 3, for "67.22" read -- 67-22 --.

Signed and sealed this 20th day of December 1960.

(SEAL)
Attest:

KARL H. AXLINE
Attesting Officer

ROBERT C. WATSON
Commissioner of Patents